United States Patent
Ahn et al.

(10) Patent No.: US 8,047,849 B2
(45) Date of Patent: Nov. 1, 2011

(54) BRAILLE DISPLAY DEVICE USING ELECTRORHEOLOGICAL FLUID AND MANUFACTURING METHOD THEREOF

(75) Inventors: Seong Deok Ahn, Daejeon (KR); Seung Youl Kang, Daejeon (KR); Chul Am Kim, Seoul (KR); Ji Young Oh, Daejeon (KR); In Kyu You, Daejeon (KR); Gi Heon Kim, Daejeon (KR); Kyu Ha Baek, Daejeon (KR); Kyung Soo Suh, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 999 days.

(21) Appl. No.: 11/999,471

(22) Filed: Dec. 5, 2007

(65) Prior Publication Data
US 2008/0138774 A1  Jun. 12, 2008

(30) Foreign Application Priority Data
Dec. 7, 2006  (KR) .................. 10-2006-0123921

(51) Int. Cl.
*G09B 21/00* (2006.01)
(52) U.S. Cl. ........................... 434/114; 434/112
(58) Field of Classification Search .................. 434/114, 434/112, 113
See application file for complete search history.

(56) References Cited

U.S. PATENT DOCUMENTS
5,222,895 A * 6/1993 Fricke ............................ 434/113
5,496,174 A * 3/1996 Garner .......................... 434/114
6,327,072 B1 12/2001 Comiskey et al.

FOREIGN PATENT DOCUMENTS
| JP | 09-297544 | 11/1997 |
| JP | 9-297544 | 11/1997 |
| JP | 11-085433 | 3/1999 |
| JP | 2004-054165 | 2/2004 |
| KR | 1020000038125 | 7/2000 |
| KR | 10-2004-0070624 | 8/2004 |
| KR | 1020040070624 | 8/2004 |
| KR | 1020050034911 | 4/2005 |
| WO | WO 2004/081741 | 9/2004 |

* cited by examiner

*Primary Examiner* — Xuan Thai
*Assistant Examiner* — Banafsheh Hadizonooz
(74) *Attorney, Agent, or Firm* — Blakely, Sokoloff, Taylor & Zafman

(57) ABSTRACT

Provided are a braille display device using an electrorheological fluid and a method for manufacturing the same. The braille display device includes: a base body in which a plurality of insulating reception grooves are formed; a first electrode arranged below the base body; an electrorheological fluid received in the reception groove; a microcapsule having an electrophoresis particle which is dispersed in the electrorheological fluid; a second electrode arranged above the microcapsule; a braille pin installed above the second electrode; and a braille pin protection film arranged above the braille pin.

12 Claims, 3 Drawing Sheets

US 8,047,849 B2

BRAILLE DISPLAY DEVICE USING ELECTRORHEOLOGICAL FLUID AND MANUFACTURING METHOD THEREOF

CROSS-REFERENCE TO RELATED APPLICATION

This application claims priority to and the benefit of Korean Patent Application No. 2006-123921, filed Dec. 7, 2006, the disclosure of which is incorporated herein by reference in its entirety.

BACKGROUND

1. Field of the Invention

The present invention relates to a braille display device for blind people and a method for manufacturing the same, and more particularly, to a braille display device in which braille pins are vertically moved by an electric field using an electrorheological fluid phenomenon, so that visible information is expressed in the form of raised dots which blind people can feel with their tactile senses, and a method for manufacturing the same.

The present invention has been produced from the work supported by the IT R&D program of MIC (Ministry of Information and Communication)/IITA (Institute for Information Technology Advancement) [2005-S070-02, Flexible Display] in Korea.

2. Discussion of Related Art

A typical braille display device is disclosed in Korean Patent Publication No. 2000-38125. Hereinafter, a conventional braille display device is described in detail with reference to the attached drawings.

FIG. 1 is a perspective view of a conventional braille display device, and FIG. 2 is an exploded cross-sectional view of the conventional braille display device of FIG. 1. Referring to FIGS. 1 and 2, the conventional braille display device 100 comprises a base body 110, a plurality of braille pins 120, a plurality of electromagnets 130, a coil 135, and a cover 140.

A plurality of reception grooves 112 are formed in an upper portion of the base body 110 with a predetermined arrangement, and the braille pins 120 are installed in the reception grooves 112 and move vertically in the reception grooves 112. The electromagnet 130 wound by the coil 135 for pushing an upper portion of the braille pin 120 using a magnetic force is installed in the upper portion of each reception groove 112. The coil 135 winding the electromagnet 130 is supplied with an electric current through a power supply control portion 150. The cover 140 is installed on a surface of the base body 110 so that the upper portion of the braille pin 120 can protrude.

In the configuration of the conventional braille display device, the braille pin 120 is installed in the reception groove 112 of the base body 110 to move upward and downward, the electromagnet 130 wound by the coil 135 is installed in the upper portion of the reception groove 112 to be connected to the power supply control portion 150, and the base body 110 is covered with the cover 140. The braille pins 120 move upward or downward due to a magnetic force generated by the electromagnet 130 to thereby express various information in the form of raised dots which can be recognized by blind people.

However, the conventional braille display device is complicated in configuration since the electromagnet 130 wound by the coil 135 is installed in the upper portion of the reception groove 112, and thus it is not easy to manufacture and install, leading to low productivity. Also, due to noise occurring between the adjacent electromagnets 130 when the electromagnets 130 operate by an electrical signal of the power supply control portion 150, the braille pins 120 may operate abnormally.

SUMMARY OF THE INVENTION

The present invention is directed to a braille display device in which braille pins are selectively protruded using an electrorheological fluid phenomenon.

The present invention is also directed to a method for manufacturing a braille display device in which braille pins are selectively protruded using an electrorheological fluid phenomenon.

An aspect of the present invention provides a braille display device using an electrorheological fluid, comprising: a base body in which a plurality of insulating reception grooves are formed; a first electrode arranged below the base body; an electrorheological fluid received in the reception groove; a microcapsule having an electrophoresis particle which is dispersed in the electrorheological fluid; a second electrode arranged above the microcapsule; a braille pin installed above the second electrode; and a braille pin protection film arranged above the braille pin.

The braille display device may further comprise an upper body which is formed above the base body and has a reception groove which communicates with the insulating reception groove formed in the base body. The first and second electrodes may be disposed in a pixel form on areas corresponding to the reception grooves. The braille display device may further comprise a first electrode protection film which is formed between the first electrode and the insulating reception groove to protect the first electrode, and a second electrode protection film which is formed between the second electrode and the insulating reception groove to protect the second electrode. The electrophoresis particle and a dielectric fluid may be included in the microcapsule together. The electrophoresis particle and the dielectric fluid may be made of materials having the same specific gravity.

Another aspect of the present invention provides a method for manufacturing a braille display device using an electrorheological fluid, comprising the steps of: preparing a base body having a plurality of insulating reception grooves formed therein; installing a first electrode having a first electrode protection film formed thereon below the base body; injecting an electrorheological fluid in which a plurality of microcapsules are dispersed into each of the reception grooves; installing a second electrode having a second electrode protection film formed thereon and contacting the electrorheological fluid in the reception groove having the electrorheological fluid injected therein; forming a braille pin above the second electrode in the reception groove; and forming a braille pin protection film above the braille pin.

A volume weight of the microcapsule may range from about 10 to about 50 volume percent of the total volume weight of the electrorheological fluid. A volume weight of an insulating dielectric fluid which constitutes the electrorheological fluid having the microcapsules dispersed therein may range from about 50 to about 90 volume percent of the total volume weight of the electrorheological fluid. A thickness of a polymer film which surrounds the microcapsule may range from about 0.1 to about 0.3 µm. The microcapsule may contain an electrophoresis particle and a dielectric fluid therein. A size of the electrophoresis particle may range from about 10 to about 500 nm.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. Therefore, the following embodiments are described in order for this disclosure to be complete and enabling to those of ordinary skill in the art.

The present invention relates to a braille display device using an electrorheological fluid phenomenon, and characteristics of an electrorheological fluid are described below.

The electrorheological fluid is a suspension in which particles having a strong polarizability are dispersed in an insulating fluid, and its Theological mechanical characteristics change when a strong electric field is externally applied. When an electric field is applied to the electrorheological fluid, dispersed particles are polarized in a direction of an electric field to form a chain structure and its viscosity is rapidly increased, compared to when an electric field is not applied, so that it is solidified. Such solidification reversibly happens according to whether there is an electric field or not, and since a response speed to an electric field is between 3 and 10 seconds, it is regarded as a material which can be applied to various industrial fields.

In order for the electrorheological fluid solidified under an electric field to flow, a stress higher than a predetermined level, i.e., an external force more than a yield stress, should be applied. In the electrorheological fluid, particles are arranged between electrodes by an electric field, i.e., a static electrical attraction is more dominant than a hydrodynamic interaction in the fluid. That is, in a situation where there is no flow, only a static electrical attraction exists between particles. In this state, when a flow starts, a chain structure of particles starts to be destroyed, and so a hydrodynamic interaction is generated in the fluid.

The electrorheological fluid solidified under an external electric field has a typical visco-elastic characteristic. Unless a particle chain structure is maintained under an electric field so that a yielding happens, the electrorheological fluid shows a linear visco-elastic characteristic, and after a yield, it shows a non-linear visco-elastic characteristic. In a linear visco-elastic area, the electrorheological fluid dominantly exhibits the elasticity, and the higher the electrical field and a density of particles the more the elasticity.

Hereinafter, exemplary embodiments of the present invention are described below with reference to attached drawings.

Figure 1:
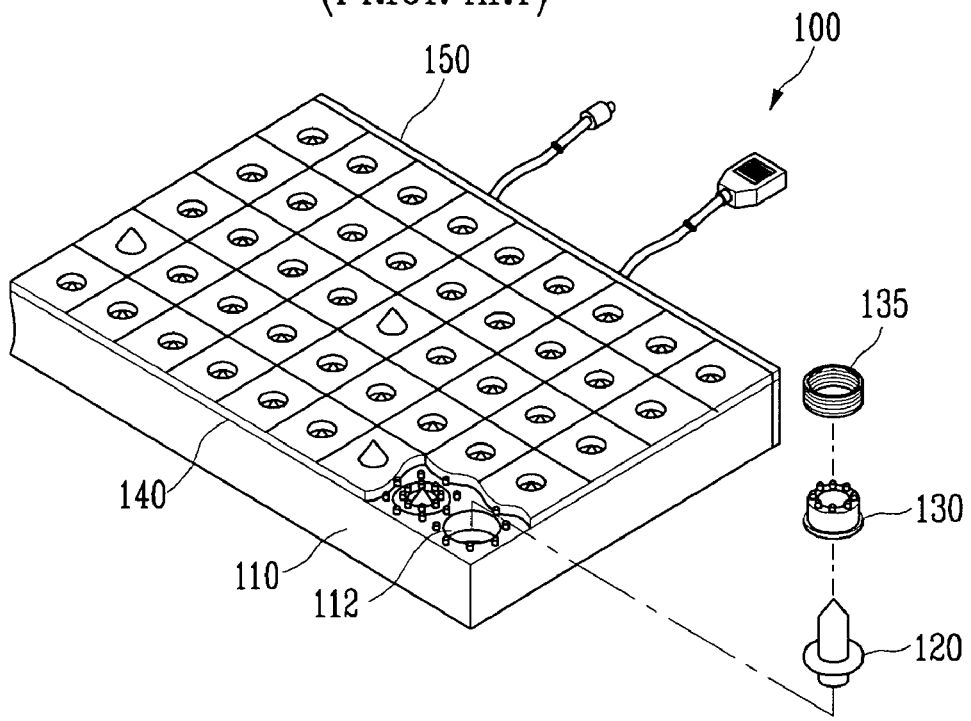
FIG. 1 is a perspective view of a conventional braille display device.
Figure 2:
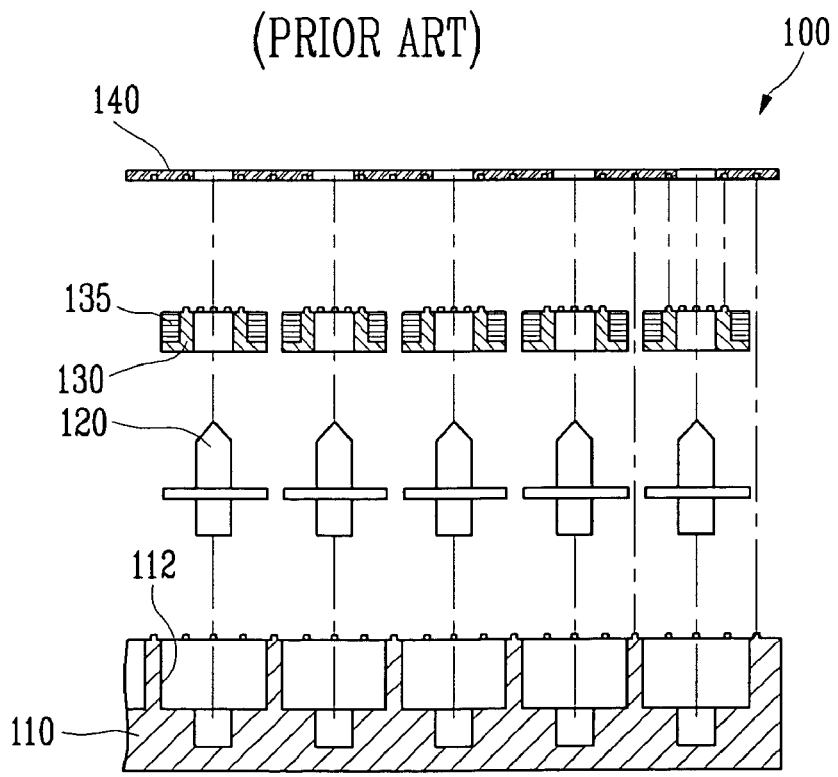
FIG. 2 is an exploded cross-sectional view of the conventional braille display device of FIG. 1.
Figure 3:
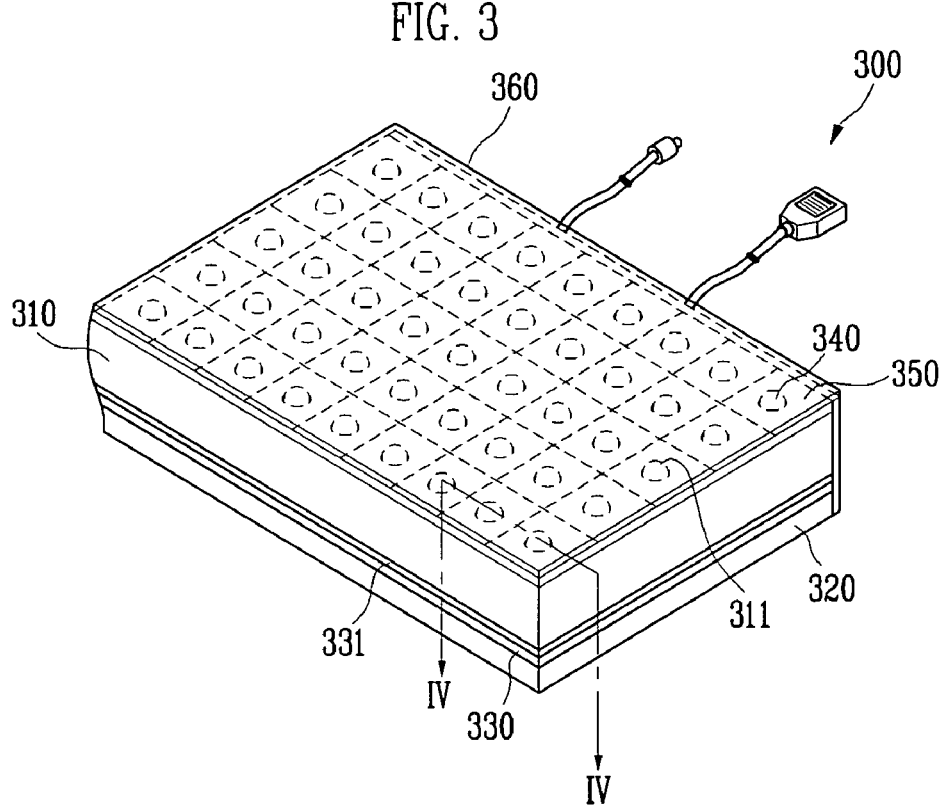
FIG. 3 is a perspective view of a braille display device using an electrorheological fluid according to an exemplary embodiment of the present invention.
Figure 4:
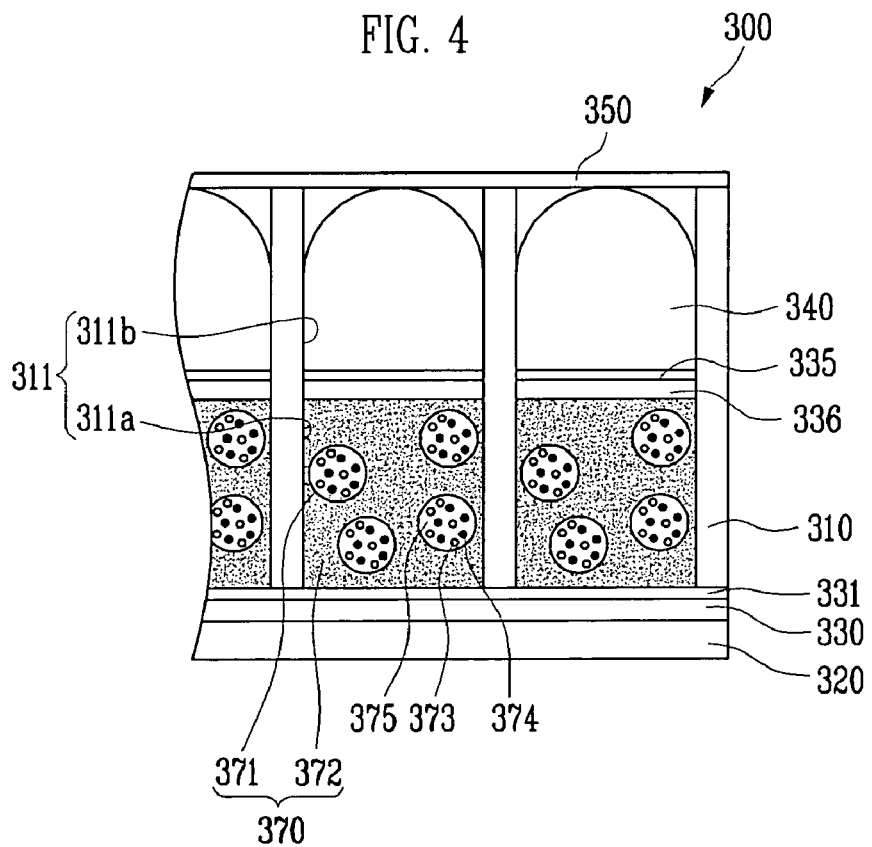
FIG. 4 is a partial cross-sectional view taken along line VI-VI' of FIG.3.

FIG. 3 is a perspective view of a braille display device using an electrorheological fluid according one exemplary embodiment of the present invention, and FIG. 4 is a partial cross-sectional view taken along line VI-VI' of FIG.3.

Referring to FIGS. 3 and 4, the braille display device 300 comprises a base body 310 having a plurality of insulating reception grooves 311 formed therein, a substrate 320 arranged below the base body 310, an electrorheological fluid 370 arranged in a lower portion of the reception groove 311, first and second electrodes 330 and 335 respectively arranged above and below the electrorheological fluid 370, a plurality of braille pins 340 arranged on the second electrode 335, and a braille pin protection film 350 above the braille pin 340.

Referring to FIG. 4, a plurality of reception grooves 311 are formed in the base body 310 which constitutes the braille display device 300 using the electrorheological fluid 370. The size of the plurality of insulating reception grooves 311 depends on the size of the braille display device, and may be in a range of millimeters to centimeters. The substrate 320 is arranged below the base body 310 having the plurality of reception grooves 311 to support the base body 310, and the first electrode 330 and a first electrode protection film 331 for protecting the first electrode 330 are arranged on the substrate 320. The first electrode 330 may be arranged over the entire area of the substrate 320 or may be arranged on areas corresponding to the plurality of reception grooves 311 in a pixel form. That is, the first electrode 320 may comprise one or more electrodes.

The electrorheological fluid is in a lower portion 311a of a groove 311. The electrorheological fluid comprises microcapsules 371 for encircling particles 373 and 374, which are distinctively operated by an electric field and dispersed, and an insulating dielectric fluid 372. Preferably, particles 373 and 374 are nanosize electrophoresis particles. The insulating dielectric fluid 372 may include mineral oil, synthetic oil, plant oil, or a mixture thereof. The synthetic oil may include silicon oil, diester oil, Poly Alpha Olefin (PAO) oil, and fluorine saturated hydrocarbon oil. The plant oil may include soy-bean oil and maize oil.

In one exemplary embodiment of the present invention, the microcapsules 371 which surround the particles (e.g., electrophoresis particles) 373 and 374 are prepared, but particles 373 and 374 which are distinctly operated by an electric field may be dispersed in the electrorheological fluid 370 without using the microcapsules 371. The first electrode protection film 331 serves not only to protect the first electrode 330 but also to separate the reception groove 311 and the electrorheological fluid 370 and to keep the microcapsules 371 from being attached to the first electrode 330 when the microcapsules 371 received in the lower portion 311a of the reception groove 311 are charged.

The second electrode 335 is arranged above the electrorheological fluid 370 received in the reception groove 311 to move the particles 373 and 374 received in the lower portion 311a of the reception groove 311 together with the first electrode 330. The second electrode protection film 336 is arranged between the second electrode 335 and the electrorheological fluid 370. The second electrode protection film 336 protects the second electrode 335, separates the lower portion 311a and an upper portion 311b of the reception groove 311, and keeps the microcapsules 371 from being attached to the second electrode 335 when the microcapsules 371 received in the reception groove 311 are charged. The braille pin 340 is arranged above the upper portion 311b of the reception groove 311, i.e., on the second electrode 335, to move upward and downward. Preferably, the braille pin 340 is made of a polymer braille pin. The braille pin protection film 350 is arranged above the braille pin 340 and is preferably made of a polymer film for easy recognition of raised dots.

FIG. 4 shows a state that an electrical field is not applied to the electrorheological fluid 370 in the lower portion 311a of the reception groove 311. That is, FIG. 4 shows movement of a general particle-dispersed suspension. The electrorheological fluid 370 of FIG. 4 is a suspension in which microcapsules 371 which surround the electrophoresis particles 373 and 374 are dispersed, and the electrophoresis particles 373 and 374 are between about 10 to 500 nm in size. In the present invention, nanosize polymer particles or inorganic particles coated with a polymer material are used as a physical/chemical means to adjust the charge density of the electrophoresis particles 373 and 374.

The microcapsules 371 are microsized particles in a dispersion system in which an electrophoresis particle 373 (having a positive charge) and an electrophoresis particle 374 (having a negative charge) are dispersed in the electrorheological fluid 375 which is surrounded by a synthetic polymer or natural polymer film. Here, the electrophoresis particles 373 and 374 and the electrorheological fluid 375 are made of materials having the same specific gravity. The microcapsules 371 are between about 10 to 50 volume percent of a volume weight of the total electrorheological fluid 370. A volume weight of the insulating dielectric fluid 372 which constitutes the electrorheological fluid 370 having the microcapsules 371 dispersed therein ranges from about 50 to about 90 volume percent of the total volume weight of the electrorheological fluid 370. A thickness of the polymer film which constitutes the microcapsules 371 ranges from about 0.1 to about 0.3 μm. The polymer film adjusts transmittance according to a density of a crosslink agent when polymerized, and the thickness of the polymer film can be changed according to a polymerization reaction time. Mechanical strength of the polymer film and the size of the microcapsules 371 can be easily adjusted by adjusting a reaction condition.

Figure 5:
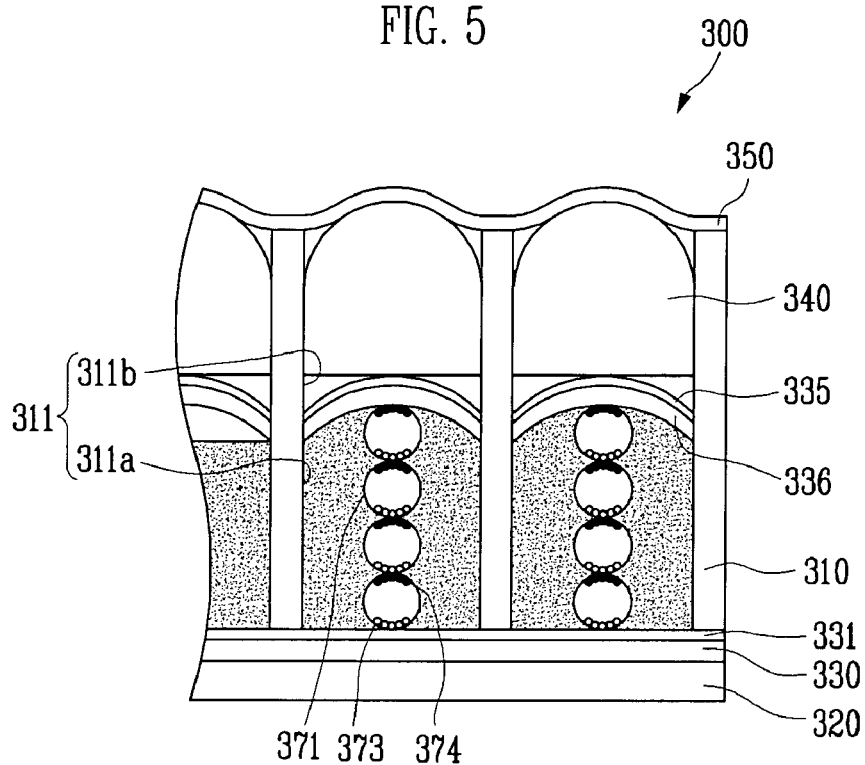
FIG. 5 is a cross-sectional view illustrating a state of the braille display device when an electrical field is applied according to an exemplary embodiment of the present invention.

FIG. 5 is a cross-sectional view illustrating a state of the braille display device when an electrical field is applied, according to one exemplary embodiment of the present invention.

Referring to FIG. 5, an electrical power is applied to the first and second electrodes 330 and 335 to form an electric field, so that theological mechanical characteristics of the electrorheological fluid 370 containing the microcapsules 371 change. The electrophoresis particles 373 and 374 in the microcapsules 371 are arranged in a vertical direction due to an electrophoresis phenomenon (e.g., polarization phenomenon) to form a chain structure. A viscosity of the electrorheological fluid 370 is rapidly increased compared to when an electrical field is not applied, so that the electrorheological fluid 370 shows movement like a solid. Here, the electrophoresis phenomenon is a phenomenon that the electrophoresis particles 373 and 374 respectively move toward the electrodes having a charge of an opposite polarity through a medium when an electric field is applied to the dielectric fluid in which the electrophoresis particles 373 and 374 having charges are dispersed. Due to such a change of the electrorheological fluid 370, the braille pins 340 in the upper portion 311b of the reception groove 311 move upward or downward, thereby expressing various information in the form of raised dots which blind people can feel. At this time, the speed at which the particles move depends on charge density, charge intensity, form and size of the electrophoresis particles 373 and 374.

Figure 6:
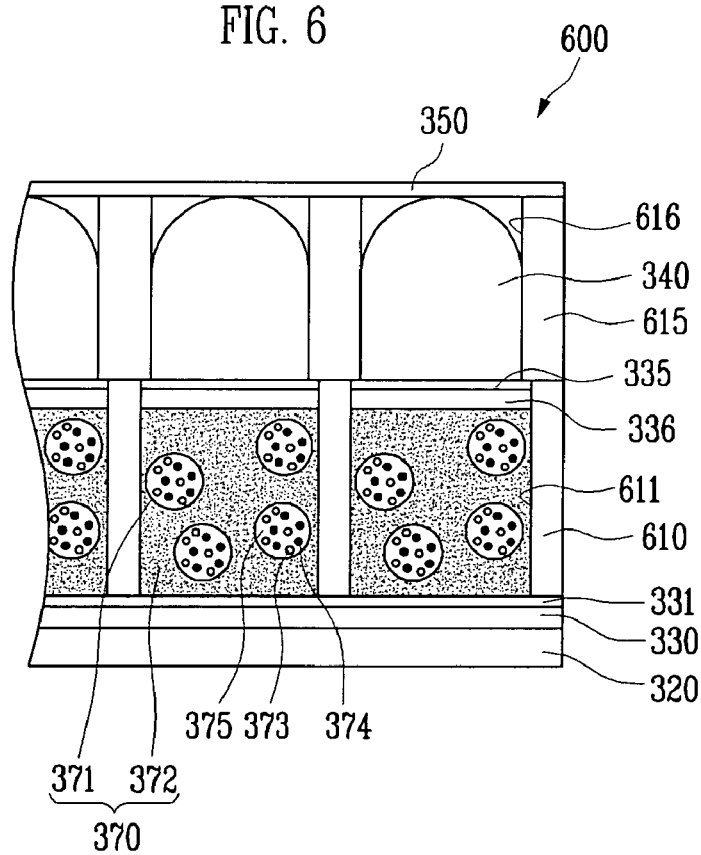
FIG. 6 is a cross-sectional view of a braille display device using an electrorheological fluid according to another exemplary embodiment of the present invention.

FIG. 6 is a cross-sectional view of a braille display device using an electrorheological fluid according to another exemplary embodiment of the present invention. For ease of description, like reference numerals denote like parts, and thus description of those is omitted.

Referring to FIG. 6, a braille display device 600 according to another exemplary embodiment of the present invention comprises a first base body 610 having a plurality of first insulating reception grooves 611 formed therein, a substrate 320 arranged below the first base body 610, a second base body having a plurality of second insulating reception grooves 616 which are arranged above the first base body 610 to communicate with the corresponding first reception grooves 611, an electrorheological fluid 370 arranged in a lower portion of the first reception grooves 611, first and second electrodes 330 and 335 respectively arranged above and below the electrorheological fluid 370, and a plurality of braille pins 340 arranged on the second electrode 335. Here, the first and second reception grooves 611 and 616 are different in size. Other components and operations therebetween are identical to those of another exemplary embodiment, and thus description of those omitted.

One exemplary embodiment of the present invention discloses the braille display device in which the electrorheological fluid and the braille pin are respectively received in the lower and upper portions of a single reception groove, but in another exemplary embodiment of the present invention, the upper base body having the reception groove for receiving the braille pin and the lower base body having the reception groove for receiving the electrorheological fluid are separately formed. Thus, since the base bodies can be separately formed, the reception grooves of a different size can be formed. For example, the reception groove formed in the upper base body can be smaller in size than that in the lower base body, or vice versa. Also, when the base bodies are separately formed, the second electrode arranged above the first base body may be arranged over the entire area as well as areas corresponding to the reception grooves. In one exemplary embodiment of the present invention, the first electrode protection film is formed over the entire surface of the substrate, but in another exemplary embodiment the first electrode protection film may be formed on portion of the first electrode corresponding to the reception grooves.

As described above, according to the braille display device using the electrorheological fluid of the present invention, the braille pins are installed to be moved vertically by the electrorheological fluid and are selectively pushed to express visible information in the form of raised dots which blind people can feel. A configuration of the braille display device is simple, and it is easy to manufacture, install and carry.

In addition, it is possible to prevent an abnormal operation of the braille pin caused from a noise occurred between the adjacent electromagnets when the electromagnets operate.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A braille display device using an electrorheological fluid, comprising:
   a base body in which a plurality of insulating reception grooves are formed;
   a first electrode arranged below the base body;
   an electrorheological fluid stored in a lower portion of each of the reception grooves;
   a microcapsule having an electrophoresis particle which is dispersed in the electrorheological fluid;

a second electrode arranged above the electrorheological fluid in each of the reception grooves;
a braille pin installed above the second electrode; and
a braille pin protection film arranged above the braille pin,
wherein the second electrode is bent to an upper direction when a voltage is applied to the first and second electrodes and a viscosity of the electrorheological fluid is changed due to an electrophoresis phenomenon.

2. The braille display device of claim 1, further comprising an upper body which is formed above the base body and has a reception groove which communicates with the insulating reception groove formed in the base body.

3. The braille display device of claim 1, wherein the first and second electrodes are disposed in a pixel form on areas corresponding to the reception grooves.

4. The braille display device of claim 1, further comprising a first electrode protection film which is formed between the first electrode and the insulating reception groove to protect the first electrode, and a second electrode protection film which is formed between the second electrode and the insulating reception groove to protect the second electrode.

5. The braille display device of claim 1, wherein the electrophoresis particle and a dielectric fluid are included in the microcapsule together.

6. The braille display device of claim 5, wherein the electrophoresis particle and the dielectric fluid are made of materials having the same specific gravity.

7. A method for manufacturing a braille display device using an electrorheological fluid, comprising the steps of:
preparing a base body having a plurality of insulating reception grooves formed therein;
installing a first electrode having a first electrode protection film formed thereon below the base body;
injecting an electrorheological fluid in which a plurality of microcapsules are dispersed into each of the reception grooves and storing the electrorheological fluid in each of the reception grooves;
installing a second electrode having a second electrode protection film formed thereon above the electrorheological fluid in each of the reception grooves;
forming a braille pin above the second electrode in the reception groove; and
forming a braille pin protection film above the braille pin,
wherein the second electrode is bent to an upper direction when a voltage is applied to the first and second electrodes and a viscosity of the electrorheological fluid is changed due to an electrophoresis phenomenon.

8. The method of claim 7, wherein a volume weight of the microcapsule ranges from about 10 to about 50 volume percent of the total volume weight of the electrorheological fluid.

9. The method of claim 7, wherein a volume weight of an insulating dielectric fluid which constitutes the electrorheological fluid having the microcapsules dispersed therein ranges from about 50 to about 90 volume percent of the total volume weight of the electrorheological fluid.

10. The method of claim 7, wherein the thickness of a polymer film which surrounds the microcapsule ranges from about 0.1 to about 0.3 .mu.m.

11. The method of claim 7, wherein the microcapsule contains an electrophoresis particle and a dielectric fluid therein.

12. The method of claim 11, wherein the size of the electrophoresis particle ranges from about 10 to about 500 nm.

* * * * *